United States Patent
Kim et al.

(10) Patent No.: US 9,999,869 B2
(45) Date of Patent: Jun. 19, 2018

(54) HIGH WATER-ABSORBENT RESIN HAVING CRUSH RESISTANCE AND METHOD FOR MANUFACTURING SAME

(71) Applicant: LG Chem, Ltd., Seoul (KR)

(72) Inventors: Su-Jin Kim, Daejeon (KR);
Young-Sam Kim, Daejeon (KR);
Young-In Yang, Daejeon (KR);
Yeon-Woo Hong, Daejeon (KR)

(73) Assignee: LG Chem, Ltd. (KR)

( * ) Notice: Subject to any disclaimer, the term of this patent is extended or adjusted under 35 U.S.C. 154(b) by 0 days. days.

(21) Appl. No.: 15/327,547

(22) PCT Filed: Feb. 18, 2016

(86) PCT No.: PCT/KR2016/001649
§ 371 (c)(1),
(2) Date: Jan. 19, 2017

(87) PCT Pub. No.: WO2016/200010
PCT Pub. Date: Dec. 15, 2016

(65) Prior Publication Data
US 2017/0173563 A1    Jun. 22, 2017

(30) Foreign Application Priority Data

Jun. 10, 2015 (KR) ........................ 10-2015-0082080

(51) Int. Cl.
| *B01J 20/32* | (2006.01) |
| *C08J 3/075* | (2006.01) |
| *C08J 3/12* | (2006.01) |
| *C08J 3/24* | (2006.01) |
| *C08J 7/14* | (2006.01) |
| *C08J 3/22* | (2006.01) |

(52) U.S. Cl.
CPC ............ *B01J 20/3265* (2013.01); *C08J 3/075* (2013.01); *C08J 3/12* (2013.01); *C08J 3/226* (2013.01); *C08J 3/24* (2013.01); *C08J 7/14* (2013.01)

(58) Field of Classification Search
CPC . B01J 20/32; B01J 20/3265; C08J 3/12; C08J 3/075
USPC ......................................................... 502/402
See application file for complete search history.

(56) References Cited

U.S. PATENT DOCUMENTS

| 5,087,656 A | 2/1992 | Yoshinaga et al. |
| 2004/0214946 A1 | 10/2004 | Smith et al. |
| 2011/0319518 A1 | 12/2011 | Kadonaga et al. |
| 2016/0151531 A1 | 6/2016 | Lee et al. |

FOREIGN PATENT DOCUMENTS

| JP | H08253597 A | 10/1996 |
| JP | 2006526691 A | 11/2006 |
| JP | 5615801 B2 | 10/2014 |
| KR | 0152990 B1 | 11/1998 |
| KR | 20110111943 A | 10/2011 |
| KR | 20150016126 A | 2/2015 |
| KR | 101507287 B1 | 3/2015 |

OTHER PUBLICATIONS

International Search Report from PCT/KR2016/001649, dated Jul. 25, 2016.

*Primary Examiner* — Edward Johnson
(74) *Attorney, Agent, or Firm* — Lerner, David, Littenberg, Krumholz & Mentlik, LLP

(57) ABSTRACT

Disclosed are a surface-modified superabsorbent polymer and a method of preparing the same, wherein a superabsorbent polymer is surface-modified with the addition of a water-soluble salt having a multivalent cation and superhydrophobic microparticles, thereby improving attrition resistance, permeability and absorption speed without significantly deteriorating the other properties thereof.

26 Claims, No Drawings

HIGH WATER-ABSORBENT RESIN HAVING CRUSH RESISTANCE AND METHOD FOR MANUFACTURING SAME

CROSS-REFERENCE TO RELATED APPLICATION

This application is a national phase entry under 35 U.S.C. § 371 of International Application No. PCT/KR2016/001649, filed Feb. 18, 2016, which claims priority to Korean Patent Application No. 10-2015-0082080, filed Jun. 10, 2015, the disclosures of which are incorporated herein by reference.

TECHNICAL FIELD

The present invention relates to an attrition-resistant superabsorbent polymer and a method of preparing the same and, more particularly, to an attrition-resistant superabsorbent polymer and a method of preparing the same, wherein a superabsorbent polymer is surface-modified with the addition of superhydrophobic microparticles and a water-soluble salt having a multivalent cation, thereby improving attrition resistance, permeability and absorption speed without significantly deteriorating other properties thereof.

BACKGROUND ART

Superabsorbent polymers (SAPs) are synthetic polymer materials that are able to absorb about 500 to 1000 times their own weight in moisture. Such superabsorbent polymers have begun to be used in real-world applications for sanitary items, and are currently being widely utilized not only in hygiene products, such as disposable baby diapers, sanitary pads and the like, but also in soil conditioners for gardening applications, water stopping agents for civil engineering and construction applications, sheets for raising seedlings, freshness preservatives for food distribution, fomentation materials, etc.

In the preparation of the superabsorbent polymer, water is a polymerization medium, and is used in various applications, including facilitating the dispersion of the crosslinking solution during the surface crosslinking process, etc. Also, residual moisture in the final product functions as an anti-static agent and a plasticizer for resin, and plays a role in suppressing the generation of very small superabsorbent polymer dust in the course of application processing and additionally preventing the grinding of the superabsorbent polymer particles. Generally, however, when water is added even in a small amount to the superabsorbent polymer, the surface stickiness of the polymer may be increased by the water absorbed on the surface thereof, and irreversible agglomeration of the superabsorbent polymer particles may take place. This increase in stickiness and agglomeration may result in poor processability, imposing a burden on preparation and application processes, consequently increasing the particle size of the superabsorbent polymer, deteriorating the properties thereof, and decreasing productivity. Superabsorbent polymers have been studied to date in terms of the polymerization process thereof and enhancements in absorption capacity thereby, and surface crosslinking for increasing the surface properties of the superabsorbent polymer or absorption under pressure thereof. Furthermore, research into changes in the surface properties of the superabsorbent polymer has been carried out in order to increase permeability or prevent caking upon storage (anti-caking).

Particularly, superabsorbent polymers, having a cross-linked three-dimensional mesh structure, swell in water but are not dissolved in water. Hence, core/shell structure techniques for increasing the crosslinking density of the surface of the superabsorbent polymer are being developed to assure permeability and high absorption under pressure. Through such techniques, final properties are determined depending on a variety of conditions, including the crosslinking density, uniform shell formation, the thickness of the shell, etc. Since the superabsorbent polymer having a core-shell structure is weak in attrition resistance, the properties thereof, especially liquid permeability, may be deteriorated after diaper processing, and the generation of fine powder may be increased during diaper processing. Hence, minimizing such problems is very important in improving diaper performance.

In this regard, Japanese Patent Application Publication No. 2006-526691 discloses a superabsorbent polymer, the surface of which is modified. However, limitations are imposed on improving attrition resistance, permeability and absorption speed by locating water in the particles. Accordingly, there is a need to develop a method of preparing a superabsorbent polymer having superior properties.

DISCLOSURE

Technical Problem

The present invention has been made keeping in mind the above problems encountered in the related art, and an object of the present invention is to provide an attrition-resistant superabsorbent polymer and a method of preparing the same, wherein a superabsorbent polymer is surface-modified with the addition of superhydrophobic microparticles and a water-soluble salt having a multivalent cation, thereby improving attrition resistance, permeability and absorption speed without significantly deteriorating the other properties thereof.

Technical Solution

In order to accomplish the above object, the present invention provides a surface-modified superabsorbent polymer, which is obtained using a water-soluble salt having a multivalent cation and particles having i) a BET specific surface area of 300 to 1500 $m^2/g$ and ii) a porosity of 50% or more.

In addition, the present invention provides a method of preparing a surface-modified superabsorbent polymer, comprising: a) providing a superabsorbent polymer; b) adding the superabsorbent polymer provided in a) with particles having i) a BET specific surface area of 300 to 1500 $m^2/g$ and ii) a porosity of 50% or more; and c) adding the superabsorbent polymer pre-treated in b) with a water-soluble salt having a multivalent cation and mixing them together to thereby modify the surface of the superabsorbent polymer.

Advantageous Effects

According to the present invention, the superabsorbent polymer is surface-modified with the addition of superhydrophobic microparticles and a water-soluble salt having a multivalent cation, thereby improving attrition resistance, permeability and absorption speed without significantly deteriorating the other properties thereof.

BEST MODE

Hereinafter, a detailed description will be given of the present invention.

According to the present invention, a surface-modified superabsorbent polymer is obtained using a water-soluble salt having a multivalent cation and particles having i) a BET specific surface area of 300 to 1500 m$^2$/g and ii) a porosity of 50% or more.

In the present invention, the water-soluble salt having a multivalent cation functions to crosslink the surface of a superabsorbent polymer. The water-soluble salt having a multivalent cation is preferably contained in an amount of 0.001 to 5.0 parts by weight based on 100 parts by weight of the superabsorbent polymer. Within the above amount range, permeability is increased without significantly deteriorating the other properties thereof.

Preferably in the water-soluble salt having a multivalent cation, the cation includes any one or more selected from the group consisting of $Al^{3+}$, $Zr^{4+}$, $Sc^{3+}$, $Ti^{4+}$, $V^{5+}$, $Cr^{3+}$, $Mn^{2+}$, $Fe^{3+}$, $Cu^{2+}$, $Zn^{2+}$, $Ag^+$, $Pt^{4+}$, and $Au^+$, and the anion includes any one or more selected from the group consisting of a sulfuric acid group ($SO_4^{2-}$), a sulfurous acid group ($SO_3^{2-}$), a nitric acid group ($NO_3^-$), a metaphosphoric acid group ($PO_3^-$), and a phosphoric acid group ($PO_4^{3-}$). Particularly useful as the salt is aluminum sulfate ($Al_2(SO_4)_3$) or zirconium sulfate ($Zr(SO_4)_2$), and the salt may be provided in the form of a hydrate.

In the present invention, the surface crosslinking of the superabsorbent polymer is performed using particles having i) a BET specific surface area of 300 to 1500 m$^2$/g and ii) a porosity of 50% or more.

Typically, a superabsorbent polymer has a hydrophilic surface, and irreversible agglomeration thereof may occur due to capillary force, hydrogen bonding, inter-particular diffusion, or inter-particular van der Waals force, attributable to the presence of water between the particles upon drying after moisture absorption. Hence, water is essentially used in the course of polymerization and surface crosslinking of the superabsorbent polymer, and thereby agglomeration occurs, thus increasing internal load, ultimately causing damage to the system. Furthermore, since the agglomerated superabsorbent polymer has a large particle size, which is unsuitable for practical use, a deagglomeration process has to be implemented so as to suitably decrease the large particle size. Also, strong force is applied during the deagglomeration process, undesirably deteriorating the properties of the superabsorbent polymer, attributable to attrition of the superabsorbent polymer.

In order to solve these problems, attempts have been made to introduce a variety of microparticles, which function to prevent direct agglomeration of the polymer particles, to the surface of the superabsorbent polymer. In the case where the microparticles are added in an excessive amount, agglomeration may be prevented, but the absorption performance of the superabsorbent polymer may decrease undesirably.

To solve such problems, the particles introduced to the superabsorbent polymer according to the present invention have a particle size ranging from 2 nm to 50 µm. Also, the particles have a BET specific surface area of 300 to 1500 m$^2$/g, preferably 500 to 1500 m$^2$/g, and more preferably 700 to 1500 m$^2$/g. The particles have superhydrophobicity with a water contact angle of 125° or more, preferably 140° or more, and more preferably 145° or more. Furthermore, the particles have a porosity of 50% or more, and preferably 90% or more. In the method of preparing the superabsorbent polymer according to the present invention, the use of the particles having the properties described above may decrease the effect of water present on the surface of the polymer, and furthermore, agglomeration may be remarkably decreased due to the use of porous superhydrophobic microparticles. Even when a relatively small amount of microparticles is used, permeability may be easily increased, and high moisture content and maintenance thereof may be readily ensured.

In the present invention, the material for particles that are included in the superabsorbent polymer is not limited so long as it has the above i) and ii) properties, and examples thereof may include, but are not limited to, inorganic oxides, such as silica, alumina, titania ($TiO_2$), and carbon, inorganic compounds, organic polymers, ion exchange resins, metals, metal salts, etc.

The microparticles are preferably added in an amount of 0.001 to 1 parts by weight based on 100 parts by weight of the superabsorbent polymer. If the amount of the microparticles is less than the above lower limit, the hydrophobicity of the superabsorbent polymer is not sufficient. On the other hand, if the amount thereof is greater than the above upper limit, the processability of the polymer may be deteriorated.

Also, adding the microparticles may include, but is not limited to, dispersing microparticles in a monomer solution, adding microparticles to a hydrogel polymer and then dry mixing them with primarily dried polymer particles, dispersing microparticles in water or an organic solvent having a dissolved surface crosslinking agent upon surface crosslinking, dry mixing microparticles separately from water or an organic solvent having a dissolved surface crosslinking agent upon surface crosslinking, or dry mixing microparticles with a surface-crosslinked product.

In the preparation of the surface-modified superabsorbent polymer according to the present invention, the surface modification may be performed by adding the superabsorbent polymer with the superhydrophobic particles having the above i) and ii) properties, and further adding them with the water-soluble salt having a multivalent cation, followed by mixing.

To this end, the method of preparing the surface-modified superabsorbent polymer according to the present invention comprises: a) providing a superabsorbent polymer; b) adding the superabsorbent polymer provided in a) with particles having i) and ii) properties; and c) adding the superabsorbent polymer pre-treated in b) with a water-soluble salt having a multivalent cation and mixing them together to thereby modify the surface of the superabsorbent polymer.

Also, the method of the invention may include milling the surface-modified superabsorbent polymer so that the milled superabsorbent polymer is sorted into particles having a size of less than 150 µm, particles having a size from 150 µm to less than 300 µm, particles having a size from 300 µm to less than 600 µm, particles having a size from 600 µm to less than 850 µm, and particles having a size of 850 µm or more. Examples of a grinder for use in the milling process may include, but are not limited, a ball mill, a pin mill, a hammer mill, a screw mill, a roll mill, a disc mill, and a jog mill.

The surface-modified superabsorbent polymer according to the present invention may exhibit attrition resistance superior to that of conventional superabsorbent polymers, because the surface of the superabsorbent polymer is modified by simultaneously using the superhydrophobic microparticles and the water-soluble salt having a multivalent cation. In particular, important properties, such as liquid permeability and absorption speed, become excellent.

In the present invention, the superabsorbent polymer, which is the base of the surface-modified superabsorbent polymer, may be used without particular limitation, so long as it is typically useful in the art. Without particular limitation, superabsorbent polymer particles, obtained by drying and grinding a hydrogel polymer resulting from thermal polymerization or photopolymerization of a monomer composition comprising a water-soluble ethylenic unsaturated monomer and a polymerization initiator, are preferably used. As necessary, those obtained by adding the superabsorbent polymer with a surface crosslinking agent may be used.

In order to prepare the superabsorbent polymer, steps and methods typically known in the art may be applied, and the following method is preferably provided.

A method of preparing the superabsorbent polymer, used in the present invention, includes: a) providing a hydrogel polymer resulting from thermal polymerization or photopolymerization of a monomer composition comprising a water-soluble ethylenic unsaturated monomer and a polymerization initiator; b) drying the hydrogel polymer; and c) grinding the dried hydrogel polymer, yielding superabsorbent polymer particles.

Also, the method of preparing the superabsorbent polymer, used in the present invention, may further include d) adding the superabsorbent polymer particles with a surface crosslinking agent so that a surface crosslinking reaction is carried out.

As used herein, the term "superabsorbent polymer particles" refers to particles obtained by drying and grinding the hydrogel polymer. More specifically, the hydrogel polymer is a material in a hard jelly phase having a size of 1 cm or more and containing moisture in a large amount (50% or more) after completion of the polymerization. The hydrogel polymer is dried and ground in a powder phase, yielding superabsorbent polymer particles. Thus, the hydrogel polymer corresponds to a process intermediate.

In the method of preparing the superabsorbent polymer according to the present invention, a) providing the hydrogel polymer resulting from thermal polymerization or photopolymerization of the monomer composition comprising the water-soluble ethylenic unsaturated monomer and the polymerization initiator is performed.

To obtain the superabsorbent polymer according to the present invention, a polymer may be prepared by steps and methods typically used in the art. Specifically, in the preparation of the superabsorbent polymer according to the present invention, the monomer composition includes a polymerization initiator. Depending on the polymerization method, when photopolymerization is performed, a photopolymerization initiator is used, and when thermal polymerization is carried out, a thermal polymerization initiator is employed. Even when photopolymerization is conducted, a predetermined amount of heat is generated due to irradiation with UV light, and also through polymerization, which is an exothermic reaction, and thus a thermal polymerization initiator may be additionally included.

In the method of preparing the superabsorbent polymer according to the present invention, the thermal polymerization initiator is not particularly limited, but preferably includes at least one selected from the group consisting of a persulfate-based initiator, an azo-based initiator, hydrogen peroxide, and ascorbic acid. Specifically, examples of the persulfate-based initiator may include sodium persulfate ($Na_2S_2O_8$), potassium persulfate ($K_2S_2O_8$), and ammonium persulfate ($(NH_4)_2S_2O_8$); and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis [2-(2-imidazolin-2-yl)propane]dihydrochloride, and 4,4-azobis-(4-cyanovaleric acid).

In the method of preparing the superabsorbent polymer according to the present invention, the photopolymerization initiator is not particularly limited, but preferably includes at least one selected from the group consisting of benzoin ether, dialkyl acetophenone, hydroxyl alkylketone, phenyl glyoxylate, benzyl dimethyl ketal, acyl phosphine, and α-aminoketone. A specific example of the acyl phosphine may include commercially available Lucirin TPO, that is, 2,4,6-trimethyl-benzoyl-trimethyl phosphine oxide.

In the method of preparing the superabsorbent polymer according to the present invention, the water-soluble ethylenic unsaturated monomer is not particularly limited so long as it is a monomer typically used to synthesize a superabsorbent polymer, and preferably includes any one or more selected from the group consisting of an anionic monomer and salts thereof, a nonionic hydrophilic monomer, and an amino group-containing unsaturated monomer and quaternary salts thereof. Specifically useful is at least one selected from the group consisting of anionic monomers and salts thereof, such as acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid, and 2-(meth)acrylamide-2-methylpropane sulfonic acid; nonionic hydrophilic monomers such as (meth)acrylamide, N-substituted (meth)acrylate, 2-hydroxyethyl(meth)acrylate, 2-hydroxypropyl (meth)acrylate, methoxypolyethyleneglycol (meth)acrylate, and polyethyleneglycol (meth)acrylate; and amino group-containing unsaturated monomers and quaternary salts thereof such as (N,N)-dimethylaminoethyl (meth)acrylate and (N,N)-dimethylaminopropyl (meth)acrylamide. More preferably, acrylic acid or salts thereof are used. When acrylic acid or salts thereof are used as the monomer, a superabsorbent polymer having improved absorbability may be advantageously obtained.

In order to recycle resources, a polymer or resin powder having a particle size of less than 150 μm, corresponding to fine powder of the prepared superabsorbent polymer powder, may be incorporated in a predetermined amount in the monomer composition during the preparation of the superabsorbent polymer according to the present invention. Specifically, a polymer or resin powder having a particle size of less than 150 μm may be added before the initiation of the polymerization of the monomer composition, or in the early, middle or late stages, after the initiation of polymerization. As such, the amount thereof that is added is not limited, but is preferably set to 1 to 10 parts by weight based on 100 parts by weight of the monomer contained in the monomer composition, in order to prevent the properties of the final superabsorbent polymer from deteriorating.

In the method of preparing the superabsorbent polymer according to the present invention, the concentration of the water-soluble ethylenic unsaturated monomer of the monomer composition may be appropriately determined in consideration of the polymerization time and the reaction conditions, and is preferably set to 40 to 55 wt %. If the concentration of the water-soluble ethylenic unsaturated monomer is less than 40 wt %, economic benefits are negated. In contrast, if the concentration thereof exceeds 55 wt %, the grinding efficiency of the hydrogel polymer may decrease.

Whether the hydrogel polymer is prepared from the monomer composition using thermal polymerization or photopolymerization is not limited, so long as it is typically useful. Specifically, polymerization methods are largely classified into thermal polymerization and photopolymerization, depending on the source of energy used for polymerization. Typically, thermal polymerization is conducted using a reactor having a stirring shaft, such as a kneader, and photopolymerization is implemented using a reactor having a movable conveyor belt. However, the above polymerization methods are merely illustrative, and the present invention is not limited to those polymerization methods.

For example, hot air is fed to a reactor with a stirring shaft, such as a kneader, or the reactor is heated, so that thermal polymerization is carried out, yielding a hydrogel polymer, which is then discharged at a size ranging from ones of mm to ones of cm through the outlet of the reactor, depending on the shape of the stirring shaft of the reactor. Specifically, the size of the hydrogel polymer may vary depending on the concentration of the supplied monomer composition and the supply rate thereof, and typically a hydrogel polymer having a particle size of 2 to 50 mm may be obtained.

Also, when photopolymerization is carried out using a reactor having a movable conveyor belt, a hydrogel polymer in sheet form having the same width as the belt may result. As such, the thickness of the polymer sheet may vary depending on the concentration of the supplied monomer composition and the supply rate thereof, but the monomer composition is preferably supplied so as to form a polymer sheet having a thickness of 0.5 to 5 cm. In the case where the monomer composition is supplied to the extent that a very thin polymer sheet is formed, production efficiency may undesirably decrease. If the thickness of the polymer sheet is greater than 5 cm, polymerization may not be uniformly carried out throughout the sheet, which is too thick.

The light source usable for photopolymerization is not particularly limited, and any UV light source may be used without limitation so long as it is known to trigger a photopolymerization reaction. For example, light having a wavelength of about 200 to 400 nm may be used, and a UV light source such as a Xe lamp, an Hg lamp, or a metal halide lamp may be adopted. Furthermore, photopolymerization may be conducted at an intensity ranging from about 0.1 mw/cm$^2$ to about 1 kw/cm$^2$ for a period of time ranging from about 5 sec to about 10 min. If the intensity of light applied to the photopolymerization reaction and the time thereof are excessively small and short, sufficient polymerization may not occur. In contrast, if they are excessively large and long, the quality of the superabsorbent polymer may deteriorate.

Next, b) drying the hydrogel polymer is performed.

The hydrogel polymer obtained in a) typically has a moisture content of 30 to 60 wt %. As used herein, the term "moisture content" refers to an amount of moisture based on the total weight of the hydrogel polymer, namely, a value obtained by subtracting the weight of the dried polymer from the weight of the hydrogel polymer. (Specifically, it is defined as a value calculated by measuring weight lost from the polymer due to the evaporation of moisture while drying the polymer at a high temperature via IR heating. As such, the drying is performed in such a manner that the temperature is increased from room temperature to 180° C. and then maintained at 180° C., and the total drying time is set to 20 min, including 5 min necessary for increasing the temperature.)

The hydrogel polymer obtained in a) is dried, and the drying temperature is preferably set to 150 to 250° C. As used herein, the term "drying temperature" refers to the temperature of a heat medium supplied for the drying process or the temperature of a drying reactor containing a heat medium and a polymer in the drying process.

If the drying temperature is lower than 150° C., the drying time may become excessively long, and the properties of the final superabsorbent polymer may thus be deteriorated. On the other hand, if the drying temperature is higher than 250° C., only the surface of the polymer may be excessively dried, and thereby fine powder may be generated in the subsequent grinding process, and the properties of the final superabsorbent polymer may be deteriorated. The drying is preferably performed at a temperature of 150 to 250° C., and more preferably 160 to 200° C.

The drying time is not limited, but may be set to 20 to 90 min, taking processing efficiency into account.

Also, the drying process is not limited, so long as it is used to dry the hydrogel polymer. Specific examples thereof may include hot air supply, IR irradiation, microwave irradiation, and UV irradiation. The polymer after the drying process may have a moisture content of 0.1 to 10 wt %.

Meanwhile, the method of preparing the superabsorbent polymer according to the present invention may further include a simple grinding process before the drying process, as necessary, in order to increase the drying efficiency. The simple grinding process is conducted before the drying process so that the particle size of the hydrogel polymer falls in the range of 1 to 15 mm Grinding the particle size of the polymer to less than 1 mm is technically difficult due to the high moisture content of the hydrogel polymer, and the ground particles may agglomerate. On the other hand, if the polymer is ground to a particle size larger than 15 mm, the effect of increasing the drying efficiency via the grinding process may become insignificant.

In the simple grinding process that precedes the drying process, any grinder may be used without limitation. A specific example thereof may include, but is not limited to, any one selected from the group consisting of a vertical pulverizer, a turbo cutter, a turbo grinder, a rotary cutter mill, a cutter mill, a disc mill, a shred crusher, a crusher, a chopper, and a disc cutter.

When the grinding process is performed to increase the drying efficiency before the drying process in this way, the polymer, which has high moisture content, may stick to the surface of the grinder. Thus, in order to increase the grinding efficiency of the hydrogel polymer before the drying process, an additive able to prevent stickiness upon grinding may be further used. The specific kind of additive that may be found useful is not limited. Examples thereof may include, but are not limited to, a fine powder agglomeration inhibitor, such as steam, water, a surfactant, and inorganic powder such as clay or silica; a thermal polymerization initiator, such as a persulfate-based initiator, an azo-based initiator, hydrogen peroxide, and ascorbic acid; and a crosslinking agent, such as an epoxy-based crosslinking agent, a diol-based crosslinking agent, a bifunctional or trifunctional or higher polyfunctional acrylate, and a monofunctional compound having a hydroxyl group.

After the drying process in the method of preparing the superabsorbent polymer according to the present invention, c) grinding the dried hydrogel polymer is performed to obtain superabsorbent polymer particles. The superabsorbent polymer particles resulting from the grinding process have a particle size of 150 to 850 μm. In the method of preparing the superabsorbent polymer according to the present invention, a grinder used to obtain such a particle size may include, but is not limited to, a pin mill, a hammer mill, a screw mill, a roll mill, a disc mill, or a jog mill.

Next, d) adding the superabsorbent polymer particles with a surface crosslinking agent is performed, so that a surface crosslinking reaction is carried out. As such, the same surface crosslinking agent or a different one may be added, depending on the particle size of the superabsorbent polymer particles.

In the method of preparing the superabsorbent polymer according to the present invention, the surface crosslinking agent that is added is not limited, so long as it is able to react with the functional group of the polymer. In order to improve the properties of the superabsorbent polymer, the surface crosslinking agent may include at least one selected from the group consisting of a polyhydric alcohol compound; an epoxy compound; a polyamine compound; a haloepoxy compound; a haloepoxy compound condensed product; an oxazoline compound; a mono-, di- or poly-oxazolidinone compound; a cyclic urea compound; a multivalent metal salt; and an alkylene carbonate compound.

Specifically, the polyhydric alcohol compound may include at least one selected from the group consisting of mono-, di-, tri-, tetra- or poly-ethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexanedimethanol.

Examples of the epoxy compound may include ethylene glycol diglycidyl ether and glycidol, and the polyamine compound may include at least one selected from the group consisting of ethylene diamine, diethylene triamine, triethylene tetramine, tetraethylene pentamine, pentaethylene hexamine, polyethyleneimine, and polyamide polyamine.

Examples of the haloepoxy compound may include epichlorohydrin, epibromohydrin, and α-methyl epichlorohydrin. The mono-, di- or poly-oxazolidinone compound may be exemplified by 2-oxazolidinone. The alkylene carbonate compound may include ethylene carbonate. These compounds may be used alone or in combination. To increase the efficiency of the surface crosslinking process, the surface crosslinking agent preferably includes at least one polyhydric alcohol compound, and more preferably includes a polyhydric alcohol compound having 2 to 10 carbon atoms.

The amount of the surface crosslinking agent added to treat the surface of the polymer particles may be appropriately determined depending on the kind of surface crosslinking agent or the reaction conditions, and is set to 0.001 to 5 parts by weight, preferably 0.01 to 3 parts by weight, and more preferably 0.05 to 2 parts by weight, based on 100 parts by weight of the ground superabsorbent polymer particles.

If the amount of the surface crosslinking agent is too small, the surface crosslinking reaction does not readily occur. On the other hand, if the amount thereof exceeds 5 parts by weight based on 100 parts by weight of the polymer, the properties of the superabsorbent polymer may deteriorate due to excessive surface crosslinking reactions.

As such, the method whereby the surface crosslinking agent is added to the polymer is not limited. Specifically, the surface crosslinking agent and the polymer powder may be placed in a reaction bath and mixed, the surface crosslinking agent may be sprayed onto the polymer powder, or the polymer and the crosslinking agent may be continuously supplied and mixed using a reaction bath, such as a mixer, which operates continuously.

When the surface crosslinking agent is added, the surface temperature of the polymer is preferably 60 to 90° C.

According to an embodiment of the present invention, the temperature of the polymer itself may be 20 to 80° C. when the surface crosslinking agent is added, so that temperature is increased to the reaction temperature within 1 to 60 min to perform surface crosslinking in the presence of the surface crosslinking agent. To realize the above temperature of the polymer itself, processes after the drying process, which is carried out at a relatively high temperature, are continuously performed, and the processing time may be shortened. Alternatively, the polymer may be heated separately when it is difficult to shorten the processing time.

In the method of preparing the superabsorbent polymer according to the present invention, the surface crosslinking agent added to the polymer may be heated, so that the temperature is increased to the reaction temperature within 1 to 60 min to perform surface crosslinking in the presence of the surface crosslinking agent.

Meanwhile, in the method of preparing the superabsorbent polymer according to the present invention, when the surface crosslinking reaction is carried out after the temperature is increased to the reaction temperature within 1 to 60 min so as to prepare for surface crosslinking, the efficiency of the surface crosslinking process may be increased. Ultimately, the residual monomer content of the final superabsorbent polymer may be minimized, and a superabsorbent polymer having superior properties may be attained. As such, the temperature of the added surface crosslinking agent is adjusted within the range from 5 to 60° C., and preferably 10 to 40° C. If the temperature of the surface crosslinking agent is lower than 5° C., the effect of decreasing the rate of heating to the surface crosslinking reaction temperature by heating the surface crosslinking agent may become insignificant. On the other hand, if the temperature of the surface crosslinking agent is higher than 60° C., the surface crosslinking agent may not be uniformly dispersed in the polymer. As used herein, the surface crosslinking reaction temperature may be defined as the combined temperature of the polymer and the surface crosslinking agent that is added for the crosslinking reaction.

The heating member for the surface crosslinking reaction is not limited. Specifically, a heat medium may be supplied, or direct heating may be conducted using electricity, but the present invention is not limited thereto. Specific examples of the heat source may include steam, electricity, UV light, and IR light. Additionally, a heated thermal fluid may be used.

In the method of preparing the superabsorbent polymer according to the present invention, after heating for the crosslinking reaction, the crosslinking reaction is carried out for 1 to 60 min, preferably 5 to 40 min, and more preferably 10 to 20 min. If the crosslinking reaction time is shorter than 1 min, the crosslinking reaction may not sufficiently occur. On the other hand, if the crosslinking reaction time is longer than 60 min, the properties of the superabsorbent polymer may deteriorate due to the excessive surface crosslinking reaction, and attrition of the polymer may occur due to long-term residence in the reactor.

MODE FOR INVENTION

A better understanding of the present invention may be obtained via the following examples, which are set forth to illustrate, but are not to be construed as limiting the scope of the present invention. The scope of the present invention is given by the claims, and also contains all modifications within the meaning and range equivalent to the claims. Unless otherwise mentioned, "%" and "part", indicating amounts in the following examples and comparative examples, are given on a mass basis.

EXAMPLES

Preparation Example: Preparation of Superabsorbent Polymer 100 g of acrylic acid, 0.3 g of polyethyleneglycol diacrylate as a crosslinking agent, 0.033 g of diphenyl(2,4,6-trimethylbenzoyl)-phosphine oxide as an initiator, 38.9 g of sodium hydroxide (NaOH), and 103.9 g of water were mixed, thus preparing a monomer mixture having a monomer concentration of 50 wt %. The monomer mixture was then placed on a continuously moving conveyor belt and irradiated with UV light (at 2 mW/cm$^2$) so that UV polymerization was carried out for 2 min, thus obtaining a hydrogel polymer.

The hydrogel polymer thus obtained was cut to a size of 5×5 mm, dried in a hot air oven at 170° C. for 2 hr, ground using a pin mill, and then sorted using a sieve, thereby obtaining a superabsorbent polymer having a particle size of 150 to 850 μm. Thereafter, the superabsorbent polymer was surface-crosslinked using 3.5% ethyleneglycol diglycidyl ether, reacted at 120° C. for 1 hr, ground, and then sorted using a sieve, yielding a surface-treated superabsorbent polymer having a particle size of 150 to 850 μm.

Examples: Preparation of Surface-Modified Superabsorbent Polymer

Example 1

250 g of the superabsorbent polymer obtained in the Preparation Example described above and 0.15 g of porous superhydrophobic microparticles, namely, silica Aerogel (AeroZel™, JIOS), were placed in a stirrer and stirred at 1000 rpm for 60 sec.

Thereafter, an aqueous solution of 1.6 g of zirconium sulfate.4H$_2$O dissolved in 6.25 g of water was added, followed by stirring for 180 sec. The resulting mixture was then aged for 30 min and sorted using a sieve, thus obtaining a superabsorbent polymer having a particle size of 150 to 850 μm.

The Aerogel used had a particle size of 5 μm, a BET specific surface area of 700 m$^2$/g, a water contact angle of 144°, and a porosity of 95%.

The particle size of the Aerogel was measured through Laser Diffraction using a HELOS (Helium-Neon Laser Optical System) based on ISO 13320. The BET specific surface area and porosity thereof were measured using a BET analyzer. The water contact angle was measured using a contact angle analyzer (KRUSS DSA100), and was specifically determined in a manner in which a piece of double-sided tape was attached to a flat glass plate, microparticles were applied in a monolayer thereon, and then 5 μL of ultrapure water was placed in the form of a drop on the monolayer, and the angle between the water drop and the glass plate was measured four times and averaged.

Example 2

A surface-modified superabsorbent polymer was obtained in the same manner as in Example 1, with the exception that 1.6 g of aluminum sulfate.14-18H$_2$O was used, instead of the zirconium sulfate.4H$_2$O.

Comparative Example 1

250 g of the superabsorbent polymer prepared in the Preparation Example described above was used.

The conditions of Examples 1 and 2 and Comparative Example 1 are summarized in Table 1 below.

TABLE 1

| | Superhydrophobic Microparticles (g) | Multivalent ions (g) | Water (g) |
|---|---|---|---|
| Ex. 1 | 0.15 | 1.6 (zirconium sulfate•4H$_2$O) | 6.25 |
| Ex. 2 | 0.15 | 1.6 (aluminum sulfate•14-18H$_2$O) | 6.25 |
| C. Ex. 1 | 0 | 0 | 0 |

Test Examples: Evaluation of Properties

In order to evaluate the properties of the surface-modified superabsorbent polymers, the following tests were performed.

Test Example 1: Particle Size of Superabsorbent Polymer

The superabsorbent polymers of Examples 1 and 2 and Comparative Example 1 were measured for particle size. The particle size of the superabsorbent polymer was measured using the EDANA method WSP 240.3. 100 g of the superabsorbent polymer was vibrated for 10 min under conditions of amplitude of 1.44 mm and a vibration frequency of 50 Hz using 850 μm, 600 μm, 300 μm, and 150 μm mesh sieves from Pan, after which the amount remaining on each sieve was determined. The results are shown in Table 2 below.

TABLE 2

| | Particle size distribution (%) | | | | |
|---|---|---|---|---|---|
| | 150 μm or less | 150 to 300 μm | 300 to 600 μm | 600 to 850 μm | 850 μm or more |
| Ex. 1 | 0.5 | 20.6 | 68.2 | 10.8 | 0.0 |
| Ex. 2 | 1.5 | 26.3 | 64.1 | 8.1 | 0.0 |
| C. Ex. 1 | 0.4 | 22.4 | 67.5 | 9.5 | 0.0 |

As is apparent from Table 2, showing the particle size distribution of the superabsorbent polymers of Examples 1 and 2 and Comparative Example 1, even when 3.5% of water was added to the superabsorbent polymer in Examples 1 and 2, compared to Comparative Example 1, the similar particle size distribution resulted. This is because agglomeration by water was reduced due to the effects of the superhydrophobic microparticles used in the examples.

Test Example 2: Centrifugal Retention Capacity (CRC)

The superabsorbent polymers of Examples 1 and 2 and Comparative Example 1 were measured for CRC before and after ball milling. CRC was measured using the EDANA method WSP 241.3. Specifically, 0.2 g of a sample of the prepared superabsorbent polymer, having a particle size of 300 to 600 μm, was placed in a teabag and then immersed in a 0.9% saline solution for 30 min. Thereafter, dehydration was performed for 3 min by centrifugal force of 250 G (gravity), and the amount of saline solution that was absorbed was measured. The results are shown in Table 3 below.

Test Example 3: Absorption Under Pressure (AUP)

The superabsorbent polymers of Examples 1 and 2 and Comparative Example 1 were measured for AUP before and after ball milling Specifically, 0.16 g of a sample of the prepared superabsorbent polymer, having a particle size of 300 to 600 μm, was placed in a cylinder, and a pressure of 0.9 psi was applied using a piston and a weight. Thereafter, the amount of 0.9% saline solution that was absorbed in 60 min was measured. The results are shown in Table 3 below.

Test Example 4: Permeability (Sec)

The superabsorbent polymers of Examples 1 and 2 and Comparative Example 1 were measured for permeability before and after ball milling. In order to prevent the generation of bubbles between a cock and a glass filter in the lower portion of a chromatography column, about 10 mL of water was added in the opposite direction into the column, and the column was washed two or three times with saline and then filled with at least 40 mL of 0.9% saline. A piston was placed in the chromatography column, the lower valve was opened, and the period of time (B: sec) required for the liquid surface to move from 40 mL to 20 mL was recorded, thus completing blank testing. 0.2 g of a sample of the prepared superabsorbent polymer, having a particle size ranging from 300 to 600 μm, was placed in the column, and then saline was added such that the total amount of saline that resulted was 50 mL, after which the sample was allowed to stand for 30 min so that the superabsorbent polymer was sufficiently swollen. Thereafter, the piston with a weight (0.3 psi) was placed in the chromatography column and then allowed to stand for 1 min. The cock at the bottom of the chromatography column was opened, and the period of time (T1: sec) required for the liquid surface to move from 40 mL to 20 mL was recorded. The permeability was determined based on the following Equation 1. The results are shown in Table 3 below.

$$\text{Permeability} = T1 - B \qquad \text{[Equation 1]}$$

Test Example 5: Speed of Absorption

The superabsorbent polymers of Examples 1 and 2 and Comparative Example 1 were measured for the speed of absorption before and after ball milling 50 mL of 0.9% saline was placed in a 100 mL beaker using a precision divider, magnetic bars were also placed therein, and the 100 mL beaker was placed on a magnetic stirrer preset at a rate of 600 rpm, followed by stirring. Thereafter, 2.0±0.05 g of a sample having a size of 300 to 600 μm was added to a vortex, and the period of time required until the vortex disappeared was measured. The results are shown in Table 3 below.

Test Example 6: Ball Milling

In order to evaluate attrition resistance of the superabsorbent polymers of Examples 1 and 2 and Comparative Example 1, a ball milling test was performed. To this end, a ball mill, a jar, and alumina balls were used. The maximum rotational speed of the ball mill was 350 rpm, and was set to 300 rpm in this test example. The jar had an inner diameter of about 10 cm, with a total volume of 1 L. Also, ten alumina balls having a diameter of 2.5 cm were used. 20 g of the superabsorbent polymer having a particle size of 300 to 600 μm was placed in the jar, and ball milling was performed for 20 min. After ball milling, a superabsorbent polymer having a particle size of 300 to 600 μm was separated again from among the milled superabsorbent polymer particles, and thus the percentage value was determined by diving the difference in weight between the superabsorbent polymer having a particle size of 300 to 600 μm before ball milling and the superabsorbent polymer having a particle size of 300 to 600 μm after ball milling by the weight of the superabsorbent polymer having a particle size of 300 to 600 μm before ball milling ((the weight of the superabsorbent polymer having a particle size of 300 to 600 μm before ball milling—the weight of the superabsorbent polymer having a particle size of 300 to 600 μm after ball milling)/the weight of the superabsorbent polymer having a particle size of 300 to 600 μm before ball milling) The results are shown in Table 3 below.

TABLE 3

| | Ball Milling | CRC (g/g) | AUP (g/g) | Permeability (sec) | Speed of Absorption (sec) | *Moisture Content (%) | 300 to 600 μm Particle Size Variation |
|---|---|---|---|---|---|---|---|
| Ex. 1 | Before | 32.7 | 13.8 | 15 | 67 | 3.53 | 8.3 |
| | After | 33.4 | 12.5 | 18 | 68 | | |
| Ex. 2 | Before | 32.6 | 14.4 | 18 | 65 | 3.52 | 7.5 |
| | After | 33.6 | 13.5 | 23 | 63 | | |
| C. Ex. 1 | Before | 33.9 | 16.1 | 32 | 81 | 1.26 | 11.5 |
| | After | 34.9 | 13.6 | 64 | 83 | | |

*Moisture content was measured in the last step for treating the superabsorbent polymer with Aerogel, water-soluble salt and water during the preparation of the superabsorbent polymers of Examples 1 and 2 and Comparative Example 1.

As is apparent from Table 3, the superabsorbent polymers of Examples 1 and 2, which were treated with the superhydrophobic microparticles and the water-soluble salt aqueous solution having a multivalent cation according to the present invention, were improved in permeability, compared to the conventional superabsorbent polymer. In particular, the speed of absorption was much higher in Examples 1 and 2 than in Comparative Example 1.

Based on the results of generation of fine powder after ball milling of Table 3, the amount of fine powder was low in Examples 1 and 2. This is because the superhydrophobic microparticles and the multivalent ions (zirconium sulfate or aluminum sulfate) are introduced to the surface of the superabsorbent polymer, and thus 3.5% of water is in the polymer as is apparent from the results of moisture content, thus increasing attrition resistance to thereby reduce the generation of fine powder.

The invention claimed is:

1. A surface-modified superabsorbent polymer, which is obtained using a water-soluble salt having a multivalent cation and particles having i) a BET specific surface area of 300 to 1500 m$^2$/g and ii) a porosity of 50% or more.

2. The surface-modified superabsorbent polymer of claim 1, wherein the water-soluble salt having a multivalent cation is used in an amount of 0.001 to 5.0 parts by weight based on 100 parts by weight of the superabsorbent polymer.

3. The surface-modified superabsorbent polymer of claim 1, wherein the cation of the water-soluble salt having a multivalent cation comprises any one or more selected from the group consisting of $Al^{3+}$, $Zr^{4+}$, $Sc^{3+}$, $Ti^{4+}$, $V^{5+}$, $Cr^{3+}$, $Mn^{2+}$, $Fe^{3+}$, $Ni^{2+}$, $Cu^{2+}$, $Zn^{2+}$, $Ag^+$, $Pt^{4+}$, and $Au^+$, and an anion thereof comprises any one or more selected from the group consisting of a sulfuric acid group ($SO_4^{2-}$), a sulfurous acid group ($SO_3^{2-}$), a nitric acid group ($NO_3^-$), a metaphosphoric acid group ($PO_3^-$), and a phosphoric acid group ($PO_4^{3-}$).

4. The surface-modified superabsorbent polymer of claim 3, wherein the water-soluble salt having a multivalent cation is aluminum sulfate ($Al_2(SO_4)_3$) or zirconium sulfate ($Zr(SO_4)_2$).

5. The surface-modified superabsorbent polymer of claim 1, wherein the particles have a particle size ranging from 2 nm to 50 μm.

6. The surface-modified superabsorbent polymer of claim 1, wherein the particles have superhydrophobicity with a water contact angle of 125° or more.

7. The surface-modified superabsorbent polymer of claim 1, wherein the particles have a particle size ranging from 2 nm to 50 μm and superhydrophobicity with a water contact angle of 125° or more.

8. The surface-modified superabsorbent polymer of claim 1, wherein the particles have a BET specific surface area of 500 to 1500 $m^2/g$.

9. The surface-modified superabsorbent polymer of claim 1, wherein the particles have a BET specific surface area of 700 to 1500 $m^2/g$.

10. The surface-modified superabsorbent polymer of claim 6, wherein the particles have superhydrophobicity with a water contact angle of 140° or more.

11. The surface-modified superabsorbent polymer of claim 6, wherein the particles have superhydrophobicity with a water contact angle of 145° or more.

12. The surface-modified superabsorbent polymer of claim 1, wherein the particles have a porosity of 90% or more.

13. A method of preparing a surface-modified superabsorbent polymer, comprising:
   a) providing a superabsorbent polymer;
   b) adding the superabsorbent polymer provided in a) with particles having i) a BET specific surface area of 300 to 1500 $m^2/g$ and ii) a porosity of 50% or more; and
   c) adding the superabsorbent polymer pre-treated in b) with a water-soluble salt having a multivalent cation and mixing them together to thereby modify a surface of the superabsorbent polymer.

14. The method of claim 13, further comprising milling the surface-modified superabsorbent polymer so that the milled superabsorbent polymer is sorted into particles having a size of less than 150 μm, particles having a size from 150 μm to less than 300 μm, particles having a size from 300 μm to less than 600 μm, particles having a size from 600 μm to less than 850 μm, and particles having a size of 850 μm or more.

15. The method of claim 13, wherein the cation of the water-soluble salt having a multivalent cation comprises any one or more selected from the group consisting of $Al^{3+}$, $Zr^{4+}$, $Sc^{3+}$, $Ti^{4+}$, $V^{5+}$, $Cr^{3+}$, $Mn^{2+}$, $Fe^{3+}$, $Ni^{2+}$, $Cu^{2+}$, $Zn^{2+}$, $Ag^+$, $Pt^{4+}$, and $Au^+$, and an anion thereof comprises any one or more selected from the group consisting of a sulfuric acid group ($SO_4^{2-}$), a sulfurous acid group ($SO_3^{2-}$), a nitric acid group ($NO_3^-$), a metaphosphoric acid group ($PO_3^-$), and a phosphoric acid group ($PO_4^{3-}$).

16. The method of claim 13, wherein the water-soluble salt having a multivalent cation is aluminum sulfate ($Al_2(SO_4)_3$) or zirconium sulfate ($Zr(SO_4)_2$).

17. The method of claim 13, wherein the particles have a particle size ranging from 2 nm to 50 μm.

18. The method of claim 13, wherein the particles have superhydrophobicity with a water contact angle of 125° or more.

19. The method of claim 13, wherein the particles have a particle size ranging from 2 nm to 50 μm and superhydrophobicity with a water contact angle of 125° or more.

20. The method of claim 13, wherein the particles have a BET specific surface area of 500 to 1500 $m^2/g$.

21. The method of claim 13, wherein the particles have a BET specific surface area of 700 to 1500 $m^2/g$.

22. The method of claim 18, wherein the particles have superhydrophobicity with a water contact angle of 140° or more.

23. The method of claim 18, wherein the particles have superhydrophobicity with a water contact angle of 145° or more.

24. The method of claim 18, wherein the particles have a porosity of 90% or more.

25. The method of claim 13, wherein the particles having i) a BET specific surface area of 300 to 1500 $m^2/g$ and ii) a porosity of 50% or more are used in an amount of 0.001 to 5.0 parts by weight based on 100 parts by weight of the superabsorbent polymer.

26. The method of claim 13, wherein the water-soluble salt having a multivalent cation is used in an amount of 0.001 to 5.0 parts by weight based on 100 parts by weight of the superabsorbent polymer.

\* \* \* \* \*